(12) United States Patent
Liu et al.

(10) Patent No.: US 10,972,767 B2
(45) Date of Patent: Apr. 6, 2021

(54) DEVICE AND METHOD OF HANDLING MULTIPLE FORMATS OF A VIDEO SEQUENCE

(71) Applicant: Realtek Semiconductor Corp., HsinChu (TW)

(72) Inventors: Lingzhi Liu, San Jose, CA (US); Li Liu, Beijing (CN); Jing Wang, Suzhou (CN); Wujun Chen, Suzhou (CN); Qingxi He, Suzhou (CN); Wei Pu, Jiangsu (CN); Weimin Zeng, Milpitas, CA (US); Chi-Wang Chai, Cupertino, CA (US)

(73) Assignee: Realtek Semiconductor Corp., HsinChu (TW)

( * ) Notice: Subject to any disclaimer, the term of this patent is extended or adjusted under 35 U.S.C. 154(b) by 45 days.

(21) Appl. No.: 16/172,900

(22) Filed: Oct. 29, 2018

(65) Prior Publication Data

US 2019/0132617 A1 May 2, 2019

Related U.S. Application Data

(60) Provisional application No. 62/579,902, filed on Nov. 1, 2017.

(51) Int. Cl.
| | |
|---|---|
| *H04N 19/98* | (2014.01) |
| *H04N 21/2343* | (2011.01) |
| *H04N 9/68* | (2006.01) |
| *H04N 19/124* | (2014.01) |
| *H04N 19/33* | (2014.01) |

(Continued)

(52) U.S. Cl.
CPC ......... *H04N 21/2343* (2013.01); *G06T 5/009* (2013.01); *H04N 9/68* (2013.01); *H04N 19/124* (2014.11); *H04N 19/33* (2014.11); *H04N 19/40* (2014.11); *H04N 19/46* (2014.11); *H04N 19/70* (2014.11); *H04N 21/23439* (2013.01); *H04N 21/816* (2013.01); *H04N 19/132* (2014.11); *H04N 19/176* (2014.11); *H04N 19/186* (2014.11)

(58) Field of Classification Search
None
See application file for complete search history.

(56) References Cited

U.S. PATENT DOCUMENTS

| | | | | |
|---|---|---|---|---|
| 2010/0309987 A1* | 12/2010 | Concion | ............. | H04N 19/124 375/240.26 |
| 2015/0042890 A1* | 2/2015 | Messmer | ................. | H04N 5/20 348/725 |

(Continued)

FOREIGN PATENT DOCUMENTS

| | | |
|---|---|---|
| CN | 102959957 A | 3/2013 |
| CN | 104969259 A | 10/2015 |

*Primary Examiner* — Nasser M Goodarzi
*Assistant Examiner* — Terrika Peterson
(74) *Attorney, Agent, or Firm* — Winston Hsu

(57) ABSTRACT

A transmitter for handling multiple formats of a video sequence, comprises a preprocessing module, for receiving a first format of a video sequence, to generate metadata of a second format of the video sequence according to the first format of the video sequence and the second format of the video sequence; and an encoder, couple to the preprocessing module, for transmitting the first format of the video sequence and the metadata in a bit stream to a receiver.

9 Claims, 13 Drawing Sheets

(51) Int. Cl.
  *H04N 19/70* (2014.01)
  *G06T 5/00* (2006.01)
  *H04N 19/40* (2014.01)
  *H04N 19/46* (2014.01)
  *H04N 21/81* (2011.01)
  *H04N 19/30* (2014.01)
  *H04N 19/186* (2014.01)
  *H04N 19/132* (2014.01)
  *H04N 19/176* (2014.01)

(56) References Cited

U.S. PATENT DOCUMENTS

| | | | |
|---|---|---|---|
| 2015/0245043 A1* | 8/2015 | Greenebaum | H04N 19/98 |
| | | | 375/240.25 |
| 2016/0330513 A1* | 11/2016 | Toma | H04N 5/57 |
| 2017/0105042 A1* | 4/2017 | Toma | H04N 5/765 |
| 2018/0020128 A1* | 1/2018 | Tsukagoshi | H04N 19/70 |
| 2018/0278967 A1* | 9/2018 | Kerofsky | H04N 19/186 |
| 2019/0132600 A1* | 5/2019 | Francois | H04N 19/30 |
| 2019/0259353 A1* | 8/2019 | Yang | H04N 5/23203 |
| 2020/0193573 A1* | 6/2020 | Thebault | H04N 9/68 |

* cited by examiner

DEVICE AND METHOD OF HANDLING MULTIPLE FORMATS OF A VIDEO SEQUENCE

CROSS REFERENCE TO RELATED APPLICATIONS

This application claims the benefit of U.S. Provisional Application No. 62/579,902 filed on Nov. 1, 2017, which is incorporated herein by reference.

BACKGROUND OF THE INVENTION

1. Field of the Invention

The present invention relates to a device and a method used in a multimedia communication system, and more particularly, to a device and a method of handling multiple formats of a video sequence.

2. Description of the Prior Art

Due to the richness and development of multimedia services, great amount of multimedia content is transmitted via communication networks. For example, a transmitter may transmit video sequences to a receiver, while the video sequences are generated according to a same video source. Simply transmitting the video sequences results great consumption of bandwidth and power. Thus, transmitting the video sequences efficiently is an important problem to be solved.

SUMMARY OF THE INVENTION

The present invention therefore provides a method and related communication device for handling multiple formats of a video sequence to solve the abovementioned problem.

A transmitter for handling multiple formats of a video sequence, comprises a preprocessing module, for receiving a first format of a video sequence, to generate metadata of a second format of the video sequence according to the first format of the video sequence and the second format of the video sequence; and an encoder, couple to the preprocessing module, for transmitting the first format of the video sequence and the metadata in a bit stream to a receiver.

A receiver for handling multiple formats of a video sequence, comprises a decoder, for receiving a bit stream comprising a first format of a video sequence and metadata of a second format of the video sequence from a transmitter; and a postprocessing module, couple to the decoder, for generating the second format of the video sequence according to the metadata and the first format of the video sequence.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
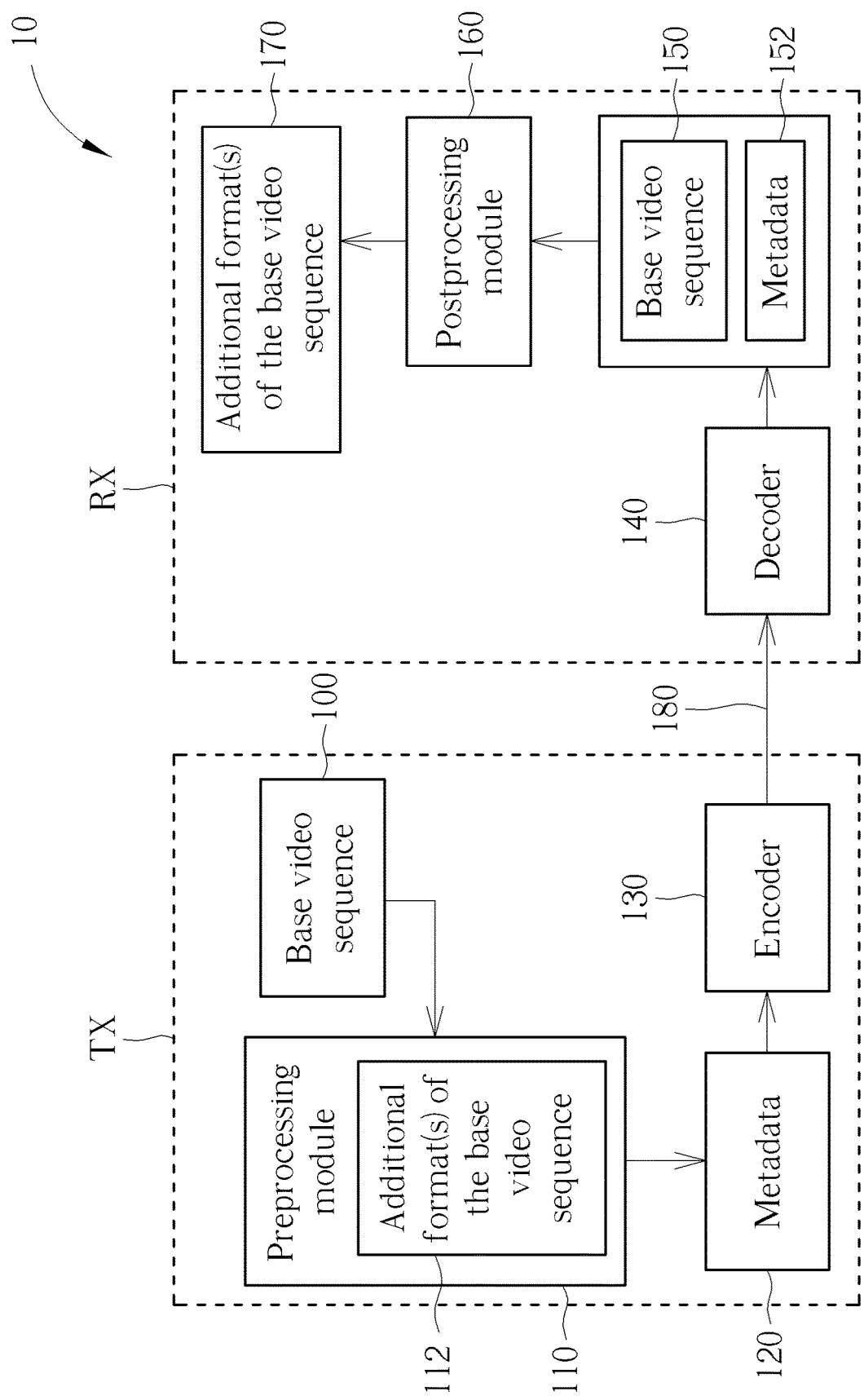
FIG. 1 is an end-to-end system with a base video directly viewable feature according to an example of the present invention.

FIG. 1 is an end-to-end system 10 with a base video directly viewable feature according to an example of the present invention. There are a transmitter TX and a receiver RX in the end-to-end system 10. In detail, the transmitter TX includes a base video sequence 100, a preprocessing module 110, additional format(s) of the base video sequence 112 and metadata 120 and an encoder 130. The receiver RX includes a decoder 140, a base video sequence 150, metadata 152, a postprocessing module 160 and additional format (s) of the base video sequence 170. The preprocessing module 110 receives the base video sequence 100, and processes the base video sequence 100 and the additional format(s) of the base video sequence 112 to generate the metadata 120. The metadata 120 includes additional information (i.e., supplementary information) for generating the additional format(s) of the base video sequence 112 according to the base video sequence 100 and the metadata 120. Then, the transmitter TX compresses and transmits the base video sequence 100 and the metadata 120 in a bit stream 180 to the receiver RX.

The decoder 140 decodes the bit stream 180 to generate the base video sequence 150 and the metadata 152, after the receiver RX receives the bit stream 180. The receiver RX may simply playback (or play) the base video sequence 150 (e.g., in a regular fashion), if the base video sequence 150 is requested/subscribed. The postprocessing module 160 generates the additional format(s) of the base video sequence 170 according to the base video sequence 150 and the metadata 152, if the additional format(s) of the base video sequence 170 is requested/subscribed. That is, the postprocessing module 160 maps the base video sequence 150 to the additional format (s) of the base video sequence 170 according to the metadata 152. Then, the receiver RX playbacks (or plays) the additional format(s) of the base video sequence 170.

It should be noted that the base video sequence 150 may be (e.g., slightly) different from the base video sequence 100, e.g., due to lossy compression or an imperfect channel experienced by the bit stream 180. The metadata 152 may be (e.g., slightly) different from the metadata 120, e.g., due to an imperfect channel experienced by the bit stream 180. That is, the base video sequence 150 and the metadata 152 may not be reconstructed perfectly. In one example, the base video sequence 150 and the metadata 152 may be the same as the base video sequence 100 and the metadata 120, respectively.

As can be seen, the present invention provides a single layer multi-application compatible solution for transmitting two or more formats of a base video sequence. Since the metadata 152 provides relation(s) between the base video sequence 150 and the additional format (s) of the base video sequence 170, a transmission of redundant video information is avoided. Thus, consumption of a bandwidth and a power of the transmitter TX can be reduced.

Depending on applications, the base video sequence 100 and the additional format(s) of the base video sequence 170 can be but not limited to one of the following combinations: standard dynamic range/high dynamic range (SDR/HDR), HDR/SDR, or HDR of different formats.

It should be noted that the bit stream 180 may be seamlessly handled by the decoder 140 in the art. Thus, there is no need to make any modification on an existing system to decode and playback received contents. When the additional format(s) of the base video sequence 170 is demanded, the post processing module 160 processes the base video sequence 150 and the metadata 152 to reconstruct the additional format (s) of the base video sequence 170. Thus, the one-layer approach is not only capable of supporting multiple formats of a video sequence, but also compatible with legacy devices.

The present invention provides a mapping mechanism for transmitting the base video sequence 100 and the additional format (s) of the base video sequence 112 in the bit stream 180. The mapping mechanism maps the base video sequence 100 to the additional format (s) of the base video sequence 112 (e.g., additional supported formats of video sequence of the same content), and generates the metadata 120 for the transmitted sequence. The metadata 120 describes a relation between the base video sequence 100 and the additional format(s) of the base video sequence 112, and is used in the decoder 140 for reconstructing the additional format(s) of the base video sequence 170.

The present invention at least includes the following advantages over the prior art:

(1) A new constant luminance approach to map HDR to SDR. Instead of performing a HDR to SDR conversion in R, G, B components individually, the present invention obtains (e.g., calculates) a constant luminance directly, maps a constant luminance to SDR, and uses the constant luminance to decide a value of chromaticity.

(2) A 3D lookup table is used for generating metadata for mapping a base video sequence to additional format(s) of the base video sequence.

(3) Although luminance and chromaticity are derived separately, it is proved that these parameters can be derived together in a RGB domain and thus a white point and three-color primaries are naturally maintained after conversion.

(4) A complete SDR generation process is performed in a ¼ resolution domain, and computational complexity is reduced significantly.

(5) The present invention can realize at least the following three applications: the encoder 130 transmitting SDR content and metadata of HDR content, and the decoder 140 and the postprocessing module 160 generating the SDR content and the HDR content; the encoder 130 transmitting the HDR content and metadata of the SDR content and the decoder 140 and the postprocessing module 160 generating the HDR content and the SDR content; and the encoder 130 transmitting the HDR content and metadata of another format of the HDR content and the decoder 140 and the postprocessing module 160 generating two formats of the HDR content. In the following sections, these applications are illustrated.

The first application includes transmitting a SDR video sequence as a base video sequence and metadata of a HDR video sequence. Nowadays, most TVs can play only SDR content, while emerging HDR TVs are demanding for eye-catching HDR content. In this application, the encoder 130 transmits the SDR video sequence and transmits HDR related information in the metadata. At the decoder 140, the SDR video sequence is decoded and played by using a current SDR receiver without any modification on the SDR receiver. If a HDR playback is supported/requested, the HDR video sequence can be reconstructed by using the SDR video sequence and the metadata.

Figure 2:
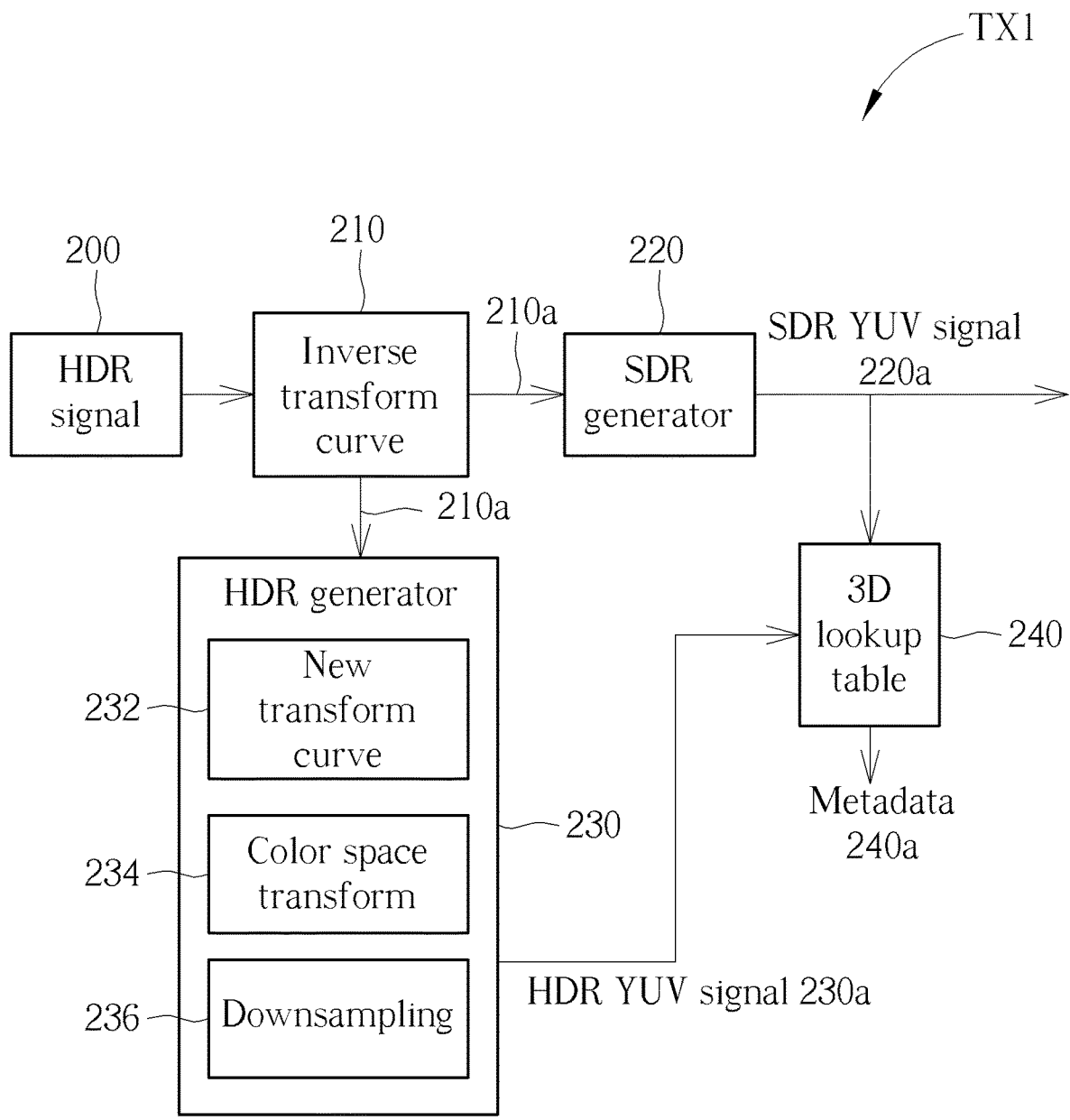
FIG. 2 is a transmitter according to an example of the present invention.

FIG. 2 is a transmitter TX1 according to an example of the present invention. The transmitter TX1 may be used for realizing the transmitter TX (the preprocessing module 110 and/or the encoder 130) in FIG. 1, and includes modules performing different signal processing functions on a HDR signal 200 (e.g., RGB signal). The HDR signal 200 may be a HDR source with a transform curve, and may be generated by a video capturing device or an editing device. The HDR signal 200 is processed by using an inverse transform curve function 210, and a resulted signal 210a (e.g., linear signal) is generated and provided to a SDR generator 220 and a HDR generator 230. The SDR generator 220 processes the resulted signal 210a, to generate a SDR YUV signal 220a. The HDR generator 230 includes a new transform curve function 232, a color space transform function 234 and a downsampling function 236, and processes the resulted signal 210a, to generate a HDR YUV signal 230a (e.g., format 4:2:0). A 3D lookup table 240 is used for generating metadata 240a according to the SDR YUV signal 220a and the HDR YUV signal 230a. The metadata 240a provides additional information by describing a relation between the SDR YUV signal 220a and the HDR YUV signal 230a. Then, the transmitter TX1 may transmit the SDR YUV signal 220a and the metadata 240a in a bit stream, e.g., to the receiver RX.

Figure 3:
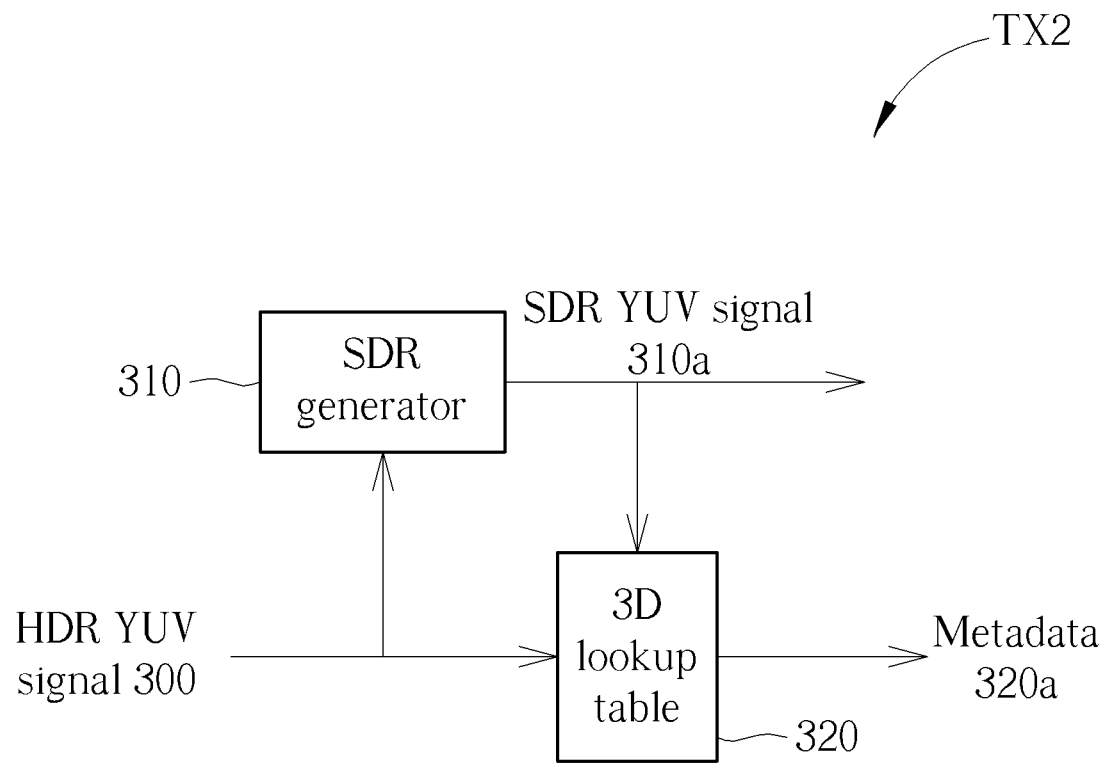
FIG. 3 is a transmitter according to an example of the present invention.

FIG. 3 is a transmitter TX2 according to an example of the present invention. The transmitter TX2 may be used for realizing the transmitter TX (the preprocessing module 110 and/or the encoder 130) in FIG. 1, and includes modules performing different signal processing functions on a HDR YUV signal 300. A SDR generator 310 processes the HDR YUV signal 300, to generate a SDR YUV signal 310a. A 3D lookup table 320 is used for generating metadata 320a according to the SDR YUV signal 310a and the HDR YUV signal 300. The metadata 320a provides additional information by describing a relation between the SDR YUV signal 310a and the HDR YUV signal 300. Then, the transmitter TX2 may transmit the SDR YUV signal 310a and the metadata 320a in a bit stream, e.g., to the receiver RX.

Figure 4:
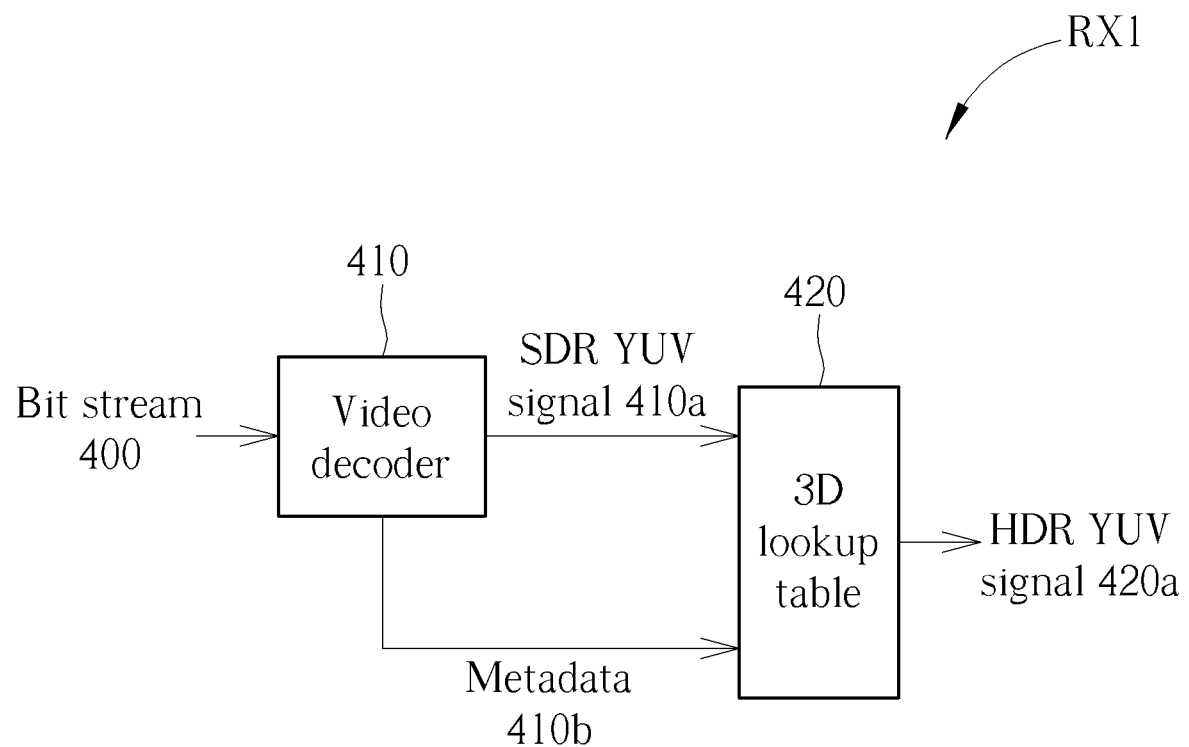
FIG. 4 is a receiver according to an example of the present invention.

FIG. 4 is a receiver RX1 according to an example of the present invention. The receiver RX1 may be used for realizing the receiver RX (the decoder 140 and/or the postprocessing module 160) in FIG. 1, and includes modules performing different signal processing functions on a bit stream 400. A video decoder 410 (e.g., audio video coding standard (AVS) decoder) processes the bit stream 400, to generate a SDR YUV signal 410a (e.g., format 4:2:0) and metadata 410b. A 3D lookup table 420 is used for generating a HDR YUV signal 420a (e.g., format 4:2:0) according to the SDR YUV signal 410a and the metadata 410b. Then, the receiver RX1 may playback the HDR YUV signal 420a.

The second application includes transmitting a HDR video sequence as a base video sequence and metadata of a SDR video sequence. After HDR content and HDR players become dominant, most TVs support HDR. As a result, a requirement for a video transmission may change. In this application, the encoder 130 transmits the HDR video sequence and transmits SDR related information in the metadata. At the decoder 140, the HDR video sequence is decoded and played by using a current HDR receiver without any modification on the HDR receiver. If a SDR playback is needed, the SDR video sequence can be reconstructed by using the HDR video sequence and the metadata.

Figure 5:
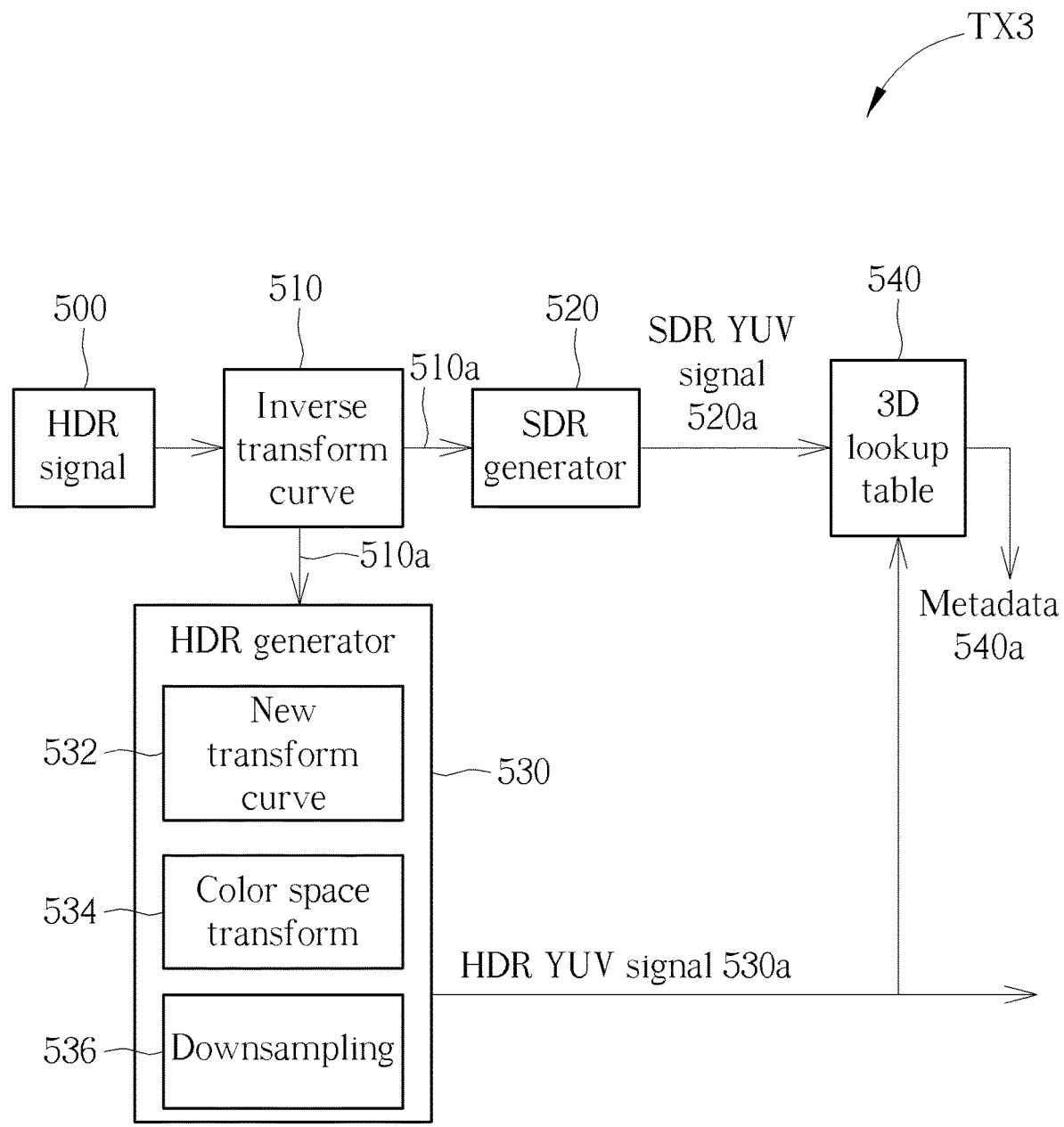
FIG. 5 is a transmitter according to an example of the present invention.

FIG. 5 is a transmitter TX3 according to an example of the present invention. The transmitter TX3 may be used for realizing the transmitter TX (the preprocessing module 110 and/or the encoder 130) in FIG. 1, and includes modules performing different signal processing functions on a HDR signal 500 (e.g., RGB signal). The HDR signal 500 may be a HDR source with a transform curve, and may be generated by a video capturing device or an editing device. The HDR signal 500 is processed by using an inverse transform curve function 510, and a resulted signal 510a (e.g., linear signal) is generated and provided to a SDR generator 520 and a HDR generator 530. The SDR generator 520 processes the resulted signal 510a, to generate a SDR YUV signal 520a. The HDR generator 530 includes a new transform curve function 532, a color space transform function 534 and a downsampling function 536, and processes the resulted signal 510a, to generate a HDR YUV signal 530a (e.g., format 4:2:0). A 3D lookup table 540 is used for generating metadata 540a according to the SDR YUV signal 520a and the HDR YUV signal 530a. The metadata 540a provides additional information by describing a relation between the SDR YUV signal 520a and the HDR YUV signal 530a. Then, the transmitter TX3 may transmit the HDR YUV signal 530a and the metadata 540a in a bit stream, e.g., to the receiver RX.

Figure 6:
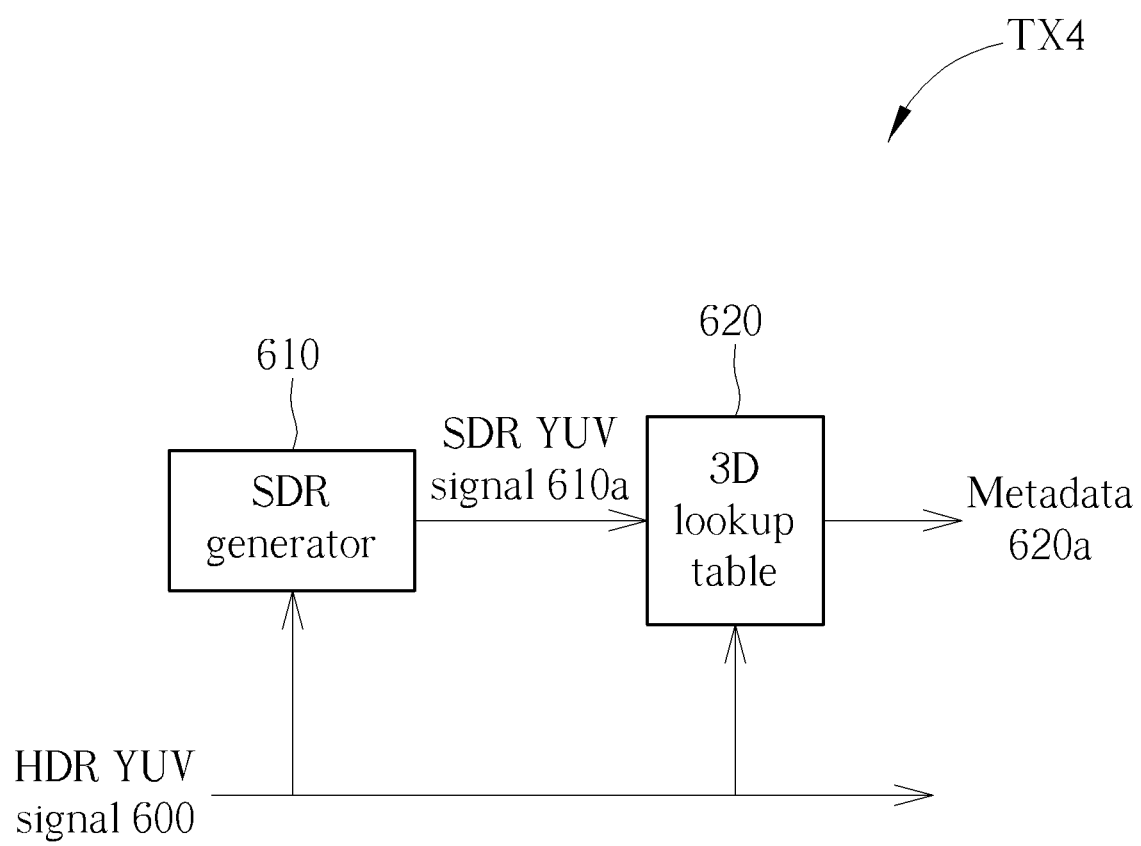
FIG. 6 is a transmitter according to an example of the present invention.

FIG. 6 is a transmitter TX4 according to an example of the present invention. The transmitter TX4 may be used for realizing the transmitter TX (the preprocessing module 110 and/or the encoder 130) in FIG. 1, and includes modules performing different signal processing functions on a HDR YUV signal 600. A SDR generator 610 processes the HDR YUV signal 600, to generate a SDR YUV signal 610a. A 3D lookup table 620 is used for generating metadata 620a according to the SDR YUV signal 610a and the HDR YUV signal 600. The metadata 620a provides additional information by describing a relation between the SDR YUV signal 610a and the HDR YUV signal 600. Then, the transmitter TX4 may transmit the HDR YUV signal 600 and the metadata 620a in a bit stream, e.g., to the receiver RX.

Figure 7:
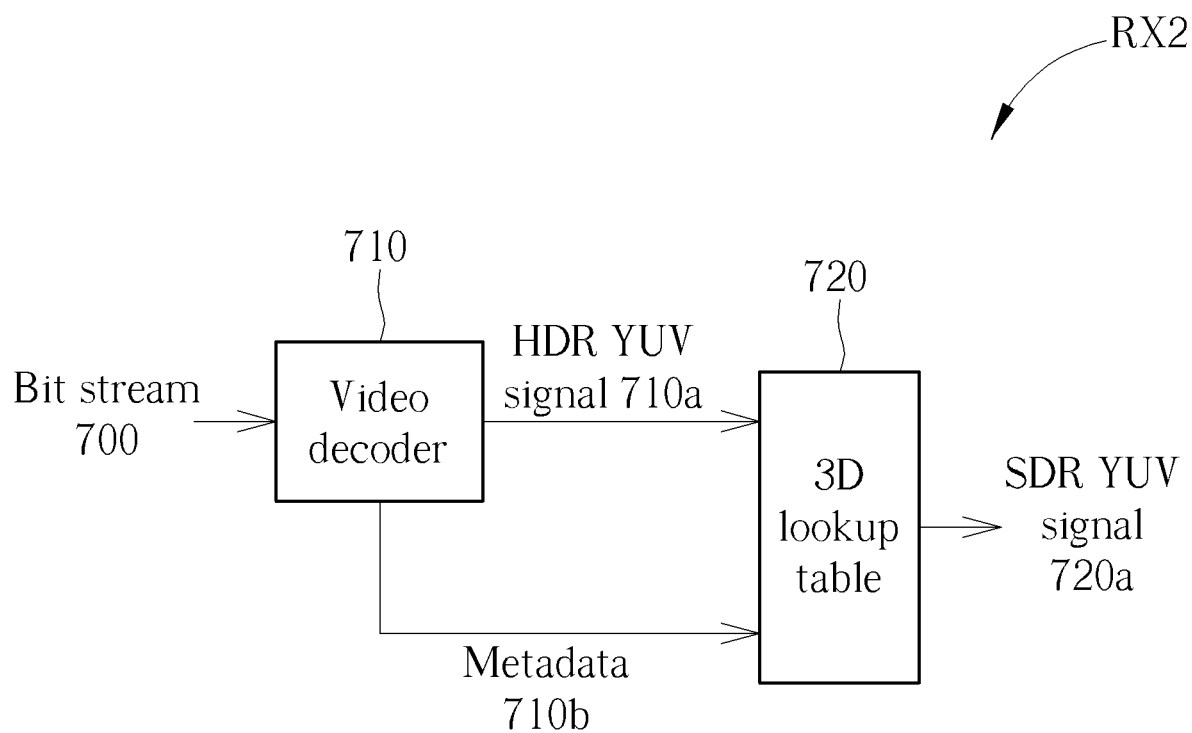
FIG. 7 is a receiver according to an example of the present invention.

FIG. 7 is a receiver RX2 according to an example of the present invention. The receiver RX2 may be used for realizing the receiver RX (the decoder 140 and/or the postprocessing module 160) in FIG. 1, and includes modules performing different signal processing functions on a bit stream 700. A video decoder 710 (e.g., AVS decoder) processes the bit stream 700, to generate a HDR YUV signal 710a (e.g., format 4:2:0) and metadata 710b. A 3D lookup table 720 is used for generating a SDR YUV signal 720a (e.g., format 4:2:0) according to the HDR YUV signal 710a and the metadata 710b. Then, the receiver RX2 may playback the SDR YUV signal 720a.

The third application includes transmitting a first format of a HDR video sequence as a base video sequence and a second format of the HDR video sequence. Contrast is one of important factors in how good a TV picture looks and it is a key part of a HDR TV. Peak brightness refers to how bright a TV can go, and is measured in a unit of "nit". The peak brightness reached by HDR TVs may be different. For example, a TV may have a peak brightness of 400 nits while another TV may have a peak brightness of 1000 nits.

Since peak brightness of TVs may be different, it is desirable that a peak brightness of HDR content can match that of a HDR TV, to have the best display result. To achieve this purpose, one format of a HDR video sequence is transmitted as a base video sequence and a 3D lookup table maps the format of the HDR video sequence to another format of the HDR video sequence in metadata. The supported formats of the HDR video sequence can be any of the following combinations: two HDR video sequences of different nits, hybrid Log-Gamma HDR/Perceptual Quantizer HDR (HLG HDR/PQ HDR) and PQ HDR/HLG HDR.

Figure 8:
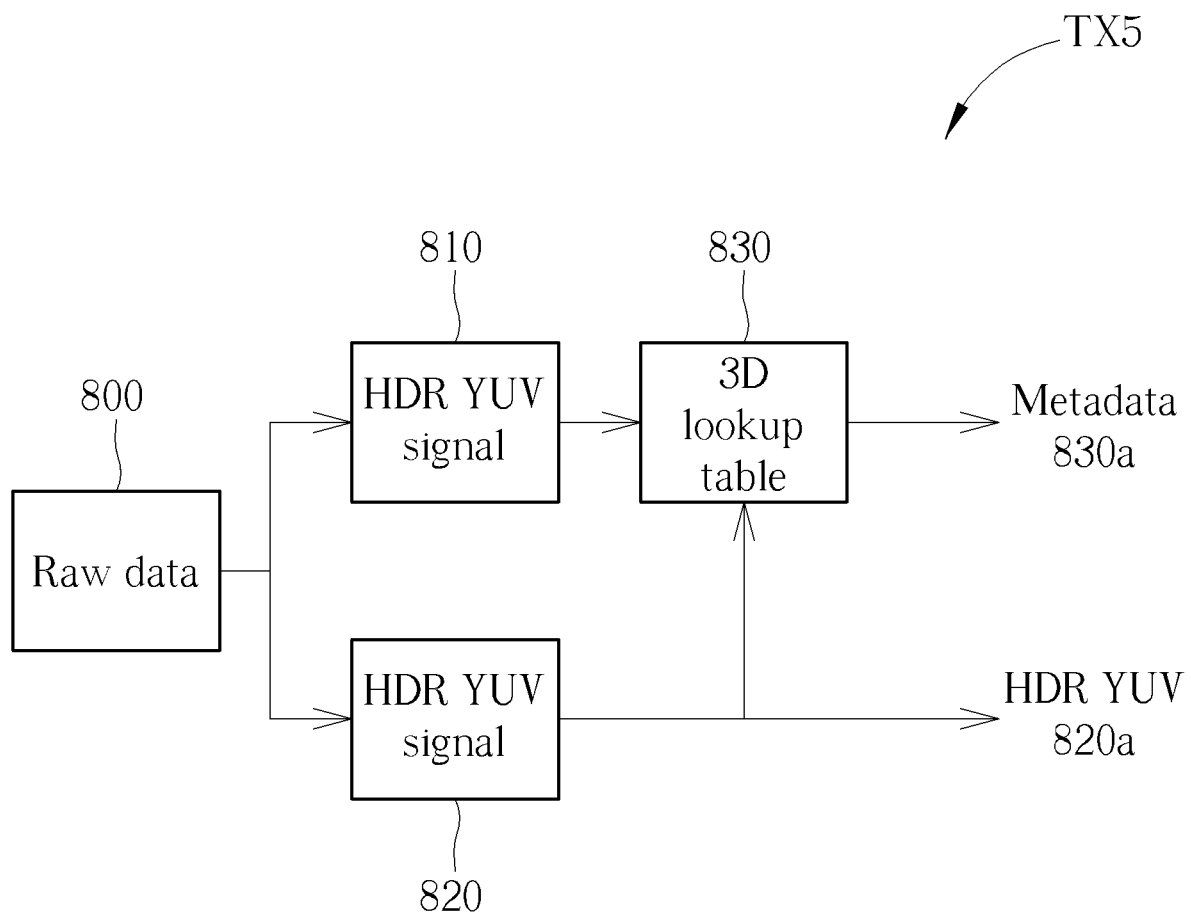
FIG. 8 is a transmitter according to an example of the present invention.

FIG. 8 is a transmitter TX5 according to an example of the present invention. The transmitter TX5 may be used for realizing the transmitter TX (the preprocessing module 110 and/or the encoder 130) in FIG. 1, and includes modules performing different signal processing functions on raw data 800. The raw data 800 may be generated by a video capturing device or an editing device. The transmitter TX5 processes the raw data 800, to generate a HDR YUV signal 810 (e.g., format HDR HLG) and a HDR YUV signal 820 (e.g., format HDR PQ). Formats (e.g., luminance, peak brightness, etc.) of the HDR YUV signals 810 and 820 are different. A 3D lookup table 830 is used for generating metadata 830a according to the HDR YUV signals 810 and 820. The metadata 830a provides additional information by describing a relation between the HDR YUV signals 810 and 820. Then, the transmitter TX5 may transmit the HDR YUV signal 820 and the metadata 830a in a bit stream, e.g., to the receiver RX.

Figure 9:
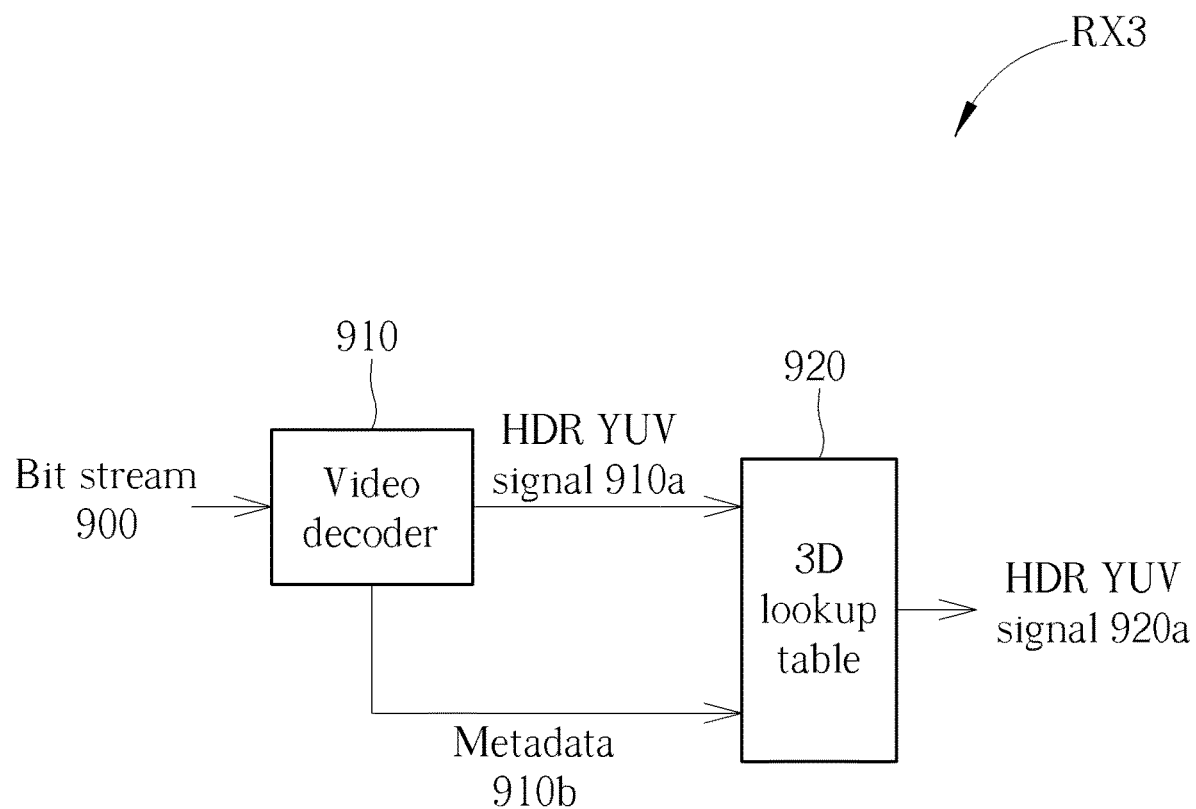
FIG. 9 is a receiver according to an example of the present invention.

FIG. 9 is a receiver RX3 according to an example of the present invention. The receiver RX3 may be used for realizing the receiver RX (the decoder 140 and/or the postprocessing module 160) in FIG. 1, and includes modules performing different signal processing functions on a bit stream 900. A video decoder 910 (e.g., AVS decoder) processes the bit stream 900, to generate a HDR YUV signal 910a (e.g., format HDR PQ) and metadata 910b. A 3D lookup table 920 is used for generating a HDR YUV signal 920a (e.g., format HDR HLG) according to the HDR YUV signal 910a and the metadata 910b. Then, the receiver RX3 may playback the HDR YUV signal 920a.

If HDR raw data are retrieved from a video capturing device directly, the HDR raw data may need to be transferred to a HDR YUV 4:2:0 format compatible with common encoders. A procedure in HDR 10 standard is adopted in the present invention.

Figure 10:
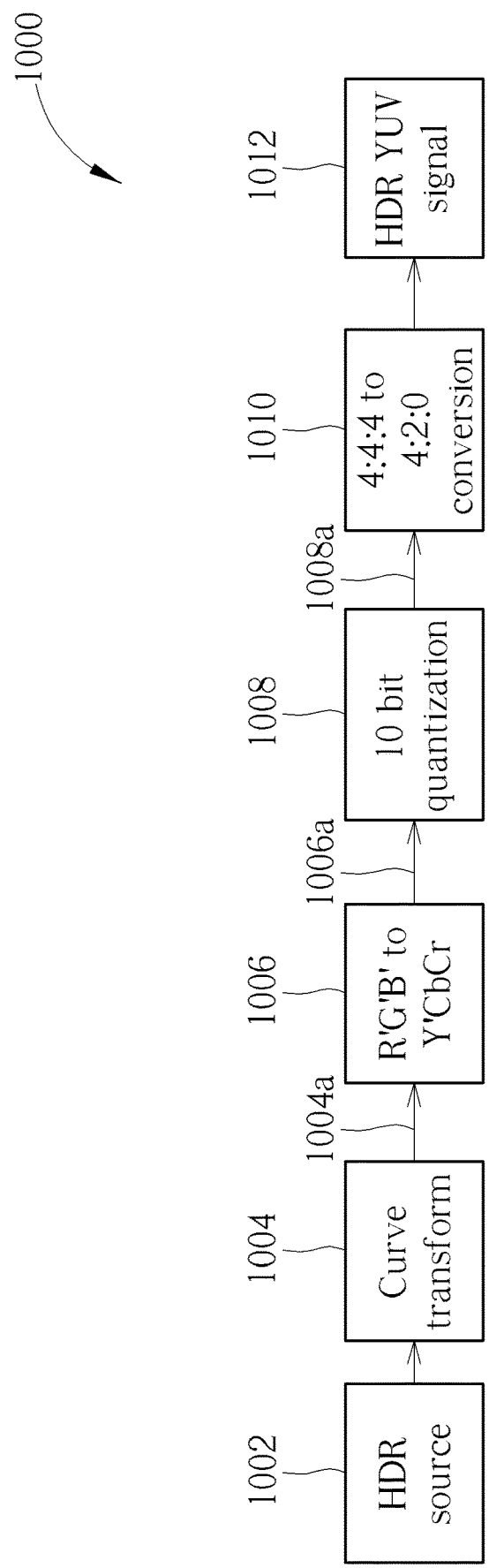
FIG. 10 is a HDR generator according to an example of the present invention.

FIG. 10 is a HDR generator 1000 according to an example of the present invention. The HDR generator 1000 may be used for realizing any of the abovementioned HDR generators or for generating a HDR signal or a HDR video sequence, and is not limited herein. The HDR generator 1000 includes modules performing different signal processing functions on a HDR source 1002. The HDR source 1002 is processed by using a curve transform 1004, and a resulted signal 1004a is generated and provided to a R'G'B' to Y'CbCr conversion 1006. Accordingly, a resulted signal 1006a is generated and provided to a 10 bit quantization 1008, and a quantized signal 1008a is generated. The quantized signal 1008a is processed by a 4:4:4 to 4:2:0 conversion 1010 (i.e., downsampling), and a HDR YUV signal 1012 is generated.

Two SDR generation methods are discussed as follows. The first SDR generation method includes generating a SDR signal according to a HDR signal generated by a video capturing device or an editing device. The second SDR generation method includes generating a SDR signal according to a HDR signal which is ready for encoding/transmitting.

Figure 11:
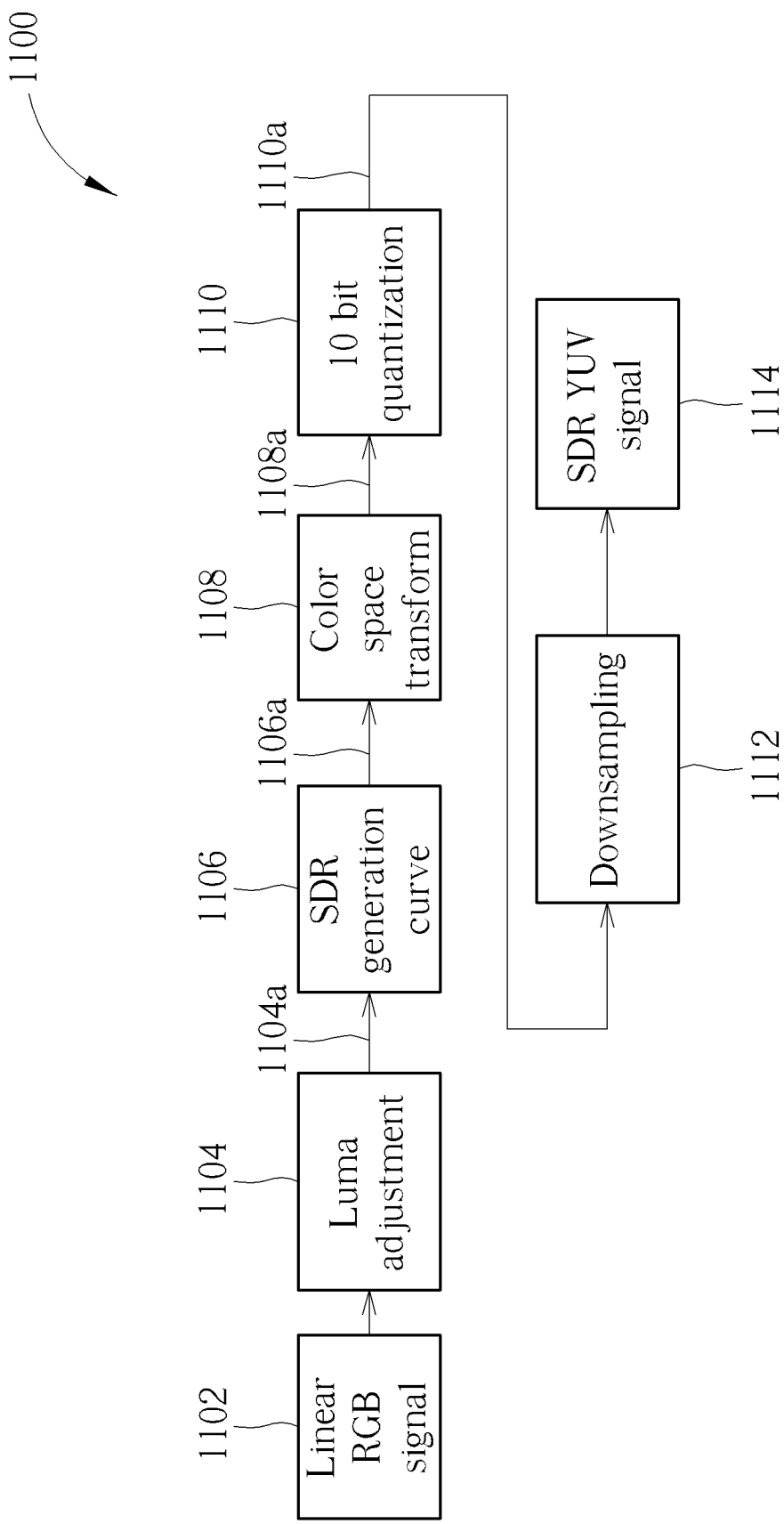
FIG. 11 is a SDR generator according to an example of the present invention.

FIG. 11 is a SDR generator 1100 according to an example of the present invention. The SDR generator 1100 may be used for realizing any of the abovementioned SDR generators or for generating a SDR signal or a SDR video sequence, and is not limited herein. The SDR generator 1100 includes modules performing different signal processing functions on a linear RGB signal 1102. The linear RGB signal 1102 is processed by using a Luma adjustment 1104, to generate an adjusted signal 1104a. A Luma adjustment value Y may be computed based on R, G, B component values, and is further adapted according to the following equation:

$$k = Y^{(1-gamma)/gamma} \quad \text{(Eq.1)}$$

wherein gamma is a system input. After the R, G, B component values are multiplied by the Luma adjustment value k, the R, G, B component values are further shaped by a SDR generation curve 1106, to generate a resulted signal 1106a. The SDR generation curve 1106 may be selected according to a ITU 1886 standard, a ITU 709 standard or a HLG standard. Then, a color space transform 1108 is performed on the resulted signal 1106a, to generate a transformed signal 1108a. The transformed signal 1108a is processed by a 10 bit quantization 1110, to generate a quantized signal 1110a. A downsampling 1112 is performed on the quantized signal 1110a, to generate a SDR YUV signal 1114.

Figure 12:
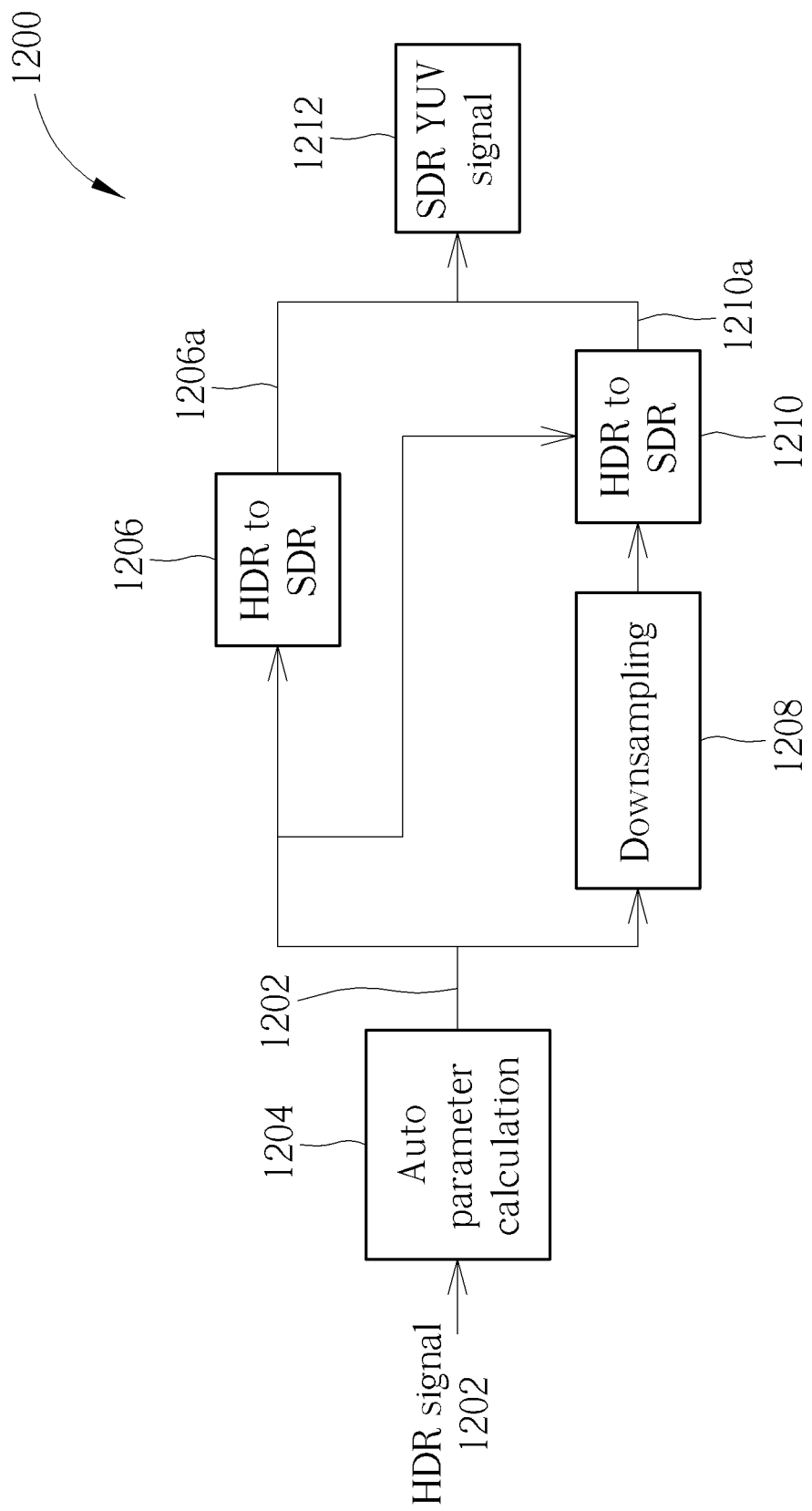
FIG. 12 is a SDR generator according to an example of the present invention.

FIG. 12 is a SDR generator 1200 according to an example of the present invention. The SDR generator 1200 may be used for realizing any of the abovementioned SDR generators or for generating a SDR signal or a SDR video sequence, and is not limited herein. The SDR generator 1200 includes modules performing different signal processing functions on a HDR signal 1202. The HDR signal 1202 may be a HDR YUV signal with a transform curve, which is ready for encoding/transmitting. The HDR signal 1202 is processed by using an auto parameter calculation 1204, to generate a mapping curve parameter f which is used for adjusting a quality of final SDR content. A luma component of the HDR signal 1202 (e.g., signal Y) is processed by a HDR to SDR function 1206 (i.e., luma mapping), to generate a SDR signal 1206a. A chroma component of the HDR signal 1202 (e.g., signal CbCr) is processed by a downsampling function 1208 and is then processed with the luma component of the HDR signal 1202 by a HDR to SDR function 1210 (i.e., chroma mapping), to generate a SDR signal 1210a. Then, a SDR YUV signal 1212 (e.g., format 4:2:0) is obtained according to the SDR signal 1206a and the SDR signal 1210a. That is, the luma component and the chroma component of the HDR signal 1202 are mapped from HDR to SDR separately to the SDR YUV signal 1212. In one example, the chroma transform is performed in ¼ pixel resolution. One major advantage of the present example is low implementation complexity as no full resolution color space transform is needed.

According to the second SDR generation method shown in FIG. 12, a luminance in SDR may be generated as follows. Given a YUV 4:2:0 signal with transform curve and $Y_0$, a classic mapping function may be used for mapping each Luma sample to $Y_t$ which is quantized to $Y_s$, where $Y_s$ is its SDR value ranged between 0 and $(2^N-1)$. The classic mapping function may be performed according to the following equations:

$$Y_t = \frac{\log\left(\frac{Y_0}{f}+1\right)}{\log\left(\frac{P}{f}+1\right)} \quad \text{(Eq. 2)}$$

$$Y_s = (2^N-1)Y_t = (2^N-1) \cdot \frac{\log\left(\frac{Y_0}{f}+1\right)}{\log\left(\frac{P}{f}+1\right)} \quad \text{(Eq. 3)}$$

where P is the maximum luminance. f is a parameter for controlling a curvature of the classic mapping function and is based on an average luma value of input HDR $L_{mean}$. f is calculated according to the following equation:

$$f = a \ast L_{mean} \ast L_{mean} + b \ast L_{mean} + c \quad \text{(Eq.4)}$$

where a=0.00001, b=0.0001, c=0.3. The values of a, b and c may be derived based on experimental results. According to the above equations, the HDR to SDR process is essentially a non-linear normalization of $Y_0$ from [0, P] to [0, 1].

A chromaticity in SDR may be generated as follows. Given a RGB signal in ¼ resolution, its linear luminance $Y_0$ and chroma $U_0$ and $V_0$ can be calculated as follows:

$$\begin{bmatrix} R \\ G \\ B \end{bmatrix} \to \begin{bmatrix} Y_0 \\ U_0 \\ V_0 \end{bmatrix} = A \cdot \begin{bmatrix} R \\ G \\ B \end{bmatrix} \quad \text{(Eq. 5)}$$

The luminance in the HDR to SDR process is the same as that in the previous step, except that the resolution of $Y_0$ and $Y_s$ is ¼ of that in the previous step. Given the ratio of $Y_s$ and $Y_0$, the RGB signal in ¼ resolution is rescaled to a RsGsBs signal according to the following equation, where the RsGsBs signal is the SDR signal in the RGB domain.

$$\begin{bmatrix} R_s \\ G_s \\ B_s \end{bmatrix} = \frac{Y_s}{Y_0} \cdot \begin{bmatrix} R \\ G \\ B \end{bmatrix} \quad \text{(Eq. 6)}$$

A CbCr signal may be calculated according to the RsGsBs signal according to the following equation:

$$\begin{bmatrix} U_s \\ V_s \end{bmatrix} = \begin{bmatrix} A_2 \\ A_3 \end{bmatrix} \cdot \begin{bmatrix} R_s \\ G_s \\ B_s \end{bmatrix} = \begin{bmatrix} A_2 \\ A_3 \end{bmatrix} \cdot \frac{Y_s}{Y_0} \cdot \begin{bmatrix} R \\ G \\ B \end{bmatrix} = \frac{Y_s}{Y_0} \cdot \begin{bmatrix} A_2 \\ A_3 \end{bmatrix} \cdot \begin{bmatrix} R \\ G \\ B \end{bmatrix} = \frac{Y_s}{Y_0} \cdot \begin{bmatrix} U_0 \\ V_0 \end{bmatrix} \quad \text{(Eq. 7)}$$

Since the objective of the HDR to SDR conversion is to reproduce the linear light in the HDR domain to a SDR range, a non-linear function is used to map a value from a linear HDR domain to the SDR range. It may not be necessary to converse RGB to a non-linear HDR domain first as the goal for the HDR to SDR conversion is not conserving perceptual details.

A set of steps are proposed for preprocessing (e.g., the preprocessing module 110):

Step 1: Multiply Y, U, V pixel values in an original color space by k, where E'=E*k and E can be Y, U or V.

Step 2: Divide the original color space into 4×2×2 cubes.

Step 3: Collect pixel values in each cube and corresponding pixel positions.

Step 4: Collect target color space pixel values according to the pixel positions obtained in Step 3.

Step 5: Calculate Y, U, V color mapping coefficients in each cube based on a 3D lookup table.

Step 6: Transmit the Y, U, V color mapping coefficients in a bit stream.

In one example, Step 5 is realized as follows. The transmitter TX only transmits a base video sequence and metadata. In order to reconstruct additional format(s) of the base video sequence at the receiver RX, a mapping method, i.e., a 3D lookup table, between the additional format(s) of the base video sequence and the base video sequence is proposed.

The main idea of the 3D lookup table is using a matrix to map or to predict the additional format(s) of the base video sequence based on the base video sequence.

Let $Y_B$, $U_B$, $V_B$ be the base video sequence and $Y_E$, $U_E$, $V_E$ be the additional format(s) of the base video sequence. Their relation can be described according to the following 3D mapping equation:

$$\begin{bmatrix} Y_E \\ U_E \\ V_E \end{bmatrix} = k \cdot \left( \begin{bmatrix} a_y & b_y & c_y \\ a_u & b_u & c_u \\ a_v & b_v & c_v \end{bmatrix} \cdot \begin{bmatrix} Y_B \\ U_B \\ V_B \end{bmatrix} + \begin{bmatrix} d_y \\ d_u \\ d_v \end{bmatrix} \right) = \begin{bmatrix} a_y & b_y & c_y \\ a_u & b_u & c_u \\ a_v & b_v & c_v \end{bmatrix} \cdot \begin{bmatrix} k \cdot Y_B \\ k \cdot U_B \\ k \cdot V_B \end{bmatrix} + k \cdot \begin{bmatrix} d_y \\ d_u \\ d_v \end{bmatrix}$$

(Eq. 8)

where k is max($Y_E$_max/$Y_B$_max, 1), which is used to reduce the value range of a, b, c, d for a better transmission efficiency. Mapping coefficients can be obtained according to a least mean square (LMS) method as follows:

$$\begin{bmatrix} a_y & b_y & c_y & d_y \\ a_u & b_u & c_u & d_u \\ a_v & b_v & c_v & d_v \end{bmatrix} = \operatorname{argmin}\left\{ \sum (Y_E - Y_B)^2 + \sum (U_E - U_B)^2 + \sum (V_E - V_B)^2 \right\}$$

(Eq. 9)

Figure 13:
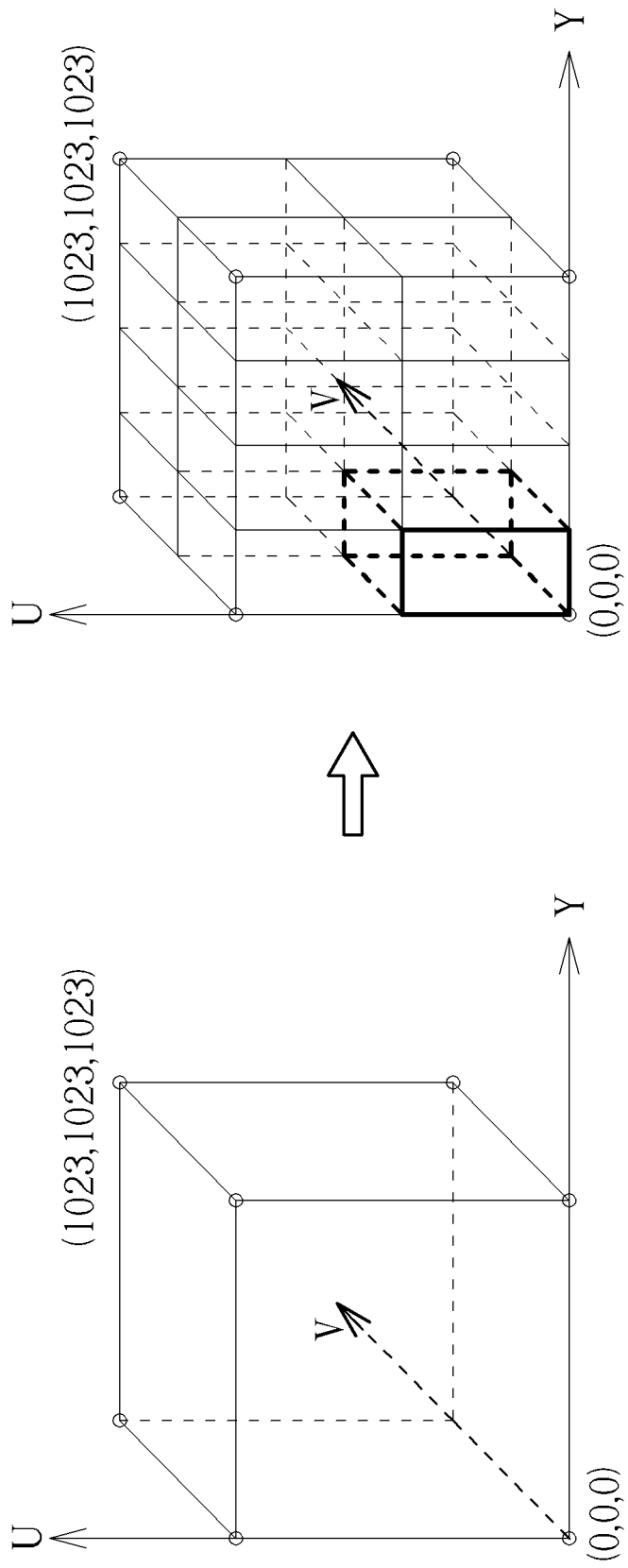
FIG. 13 is a schematic diagram of division of a base video color space according to an example of the present invention.

To reduce a mapping error, a color space of the base video sequence is further divided into several small cubes as shown in FIG. 13, which is a schematic diagram of division of a base video color space according to an example of the present invention. For each cube, corresponding groups of coefficients are calculated and transmitted as metadata individually.

A set of steps are proposed for postprocessing (e.g., the postprocessing module 160):

Step 7: Decode the Y, U, V color mapping coefficients.

Step 8: Multiply Y, U, V pixel values in the original color space by k, where E'=E*k.

Step 9: Calculate the target color space pixel values based on the 3D lookup table.

Those skilled in the art should readily make combinations, modifications and/or alterations on the abovementioned description and examples. The abovementioned transmitter, receiver, description, steps, functions, modules and/or processes including suggested steps can be realized by means that could be hardware, software, firmware (known as a combination of a hardware device and computer instructions and data that reside as read-only software on the hardware device), an electronic system, or combination thereof.

Examples of the hardware may include analog circuit(s), digital circuit (s) and/or mixed circuit (s). For example, the hardware may include application-specific integrated circuit (s) (ASIC(s)), field programmable gate array(s) (FPGA(s)), programmable logic device(s), coupled hardware components or combination thereof. In one example, the hardware includes general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include Subscriber Identity Module (SIM), Read-Only Memory (ROM), flash memory, Random Access Memory (RAM), CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

To sum up, the present invention provides a device and method for handling multiple formats of a video sequence. Thus, a transmission of redundant video information is avoided. As a result, consumption of a bandwidth and a power of a transmitter can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transmitter for handling multiple formats of a video sequence, comprising:
  a preprocessing module, for receiving a first format of a video sequence, to generate metadata of a second format of the video sequence according to the first format of the video sequence and the second format of the video sequence, wherein the metadata provides additional information by describing a relation between the first format of the video sequence and the second format of the video sequence, and the first format of the video sequence is standard dynamic range (SDR), and the second format of the video sequence is high dynamic range (HDR); and
  an encoder, couple to the preprocessing module, for transmitting the first format of the video sequence and the metadata in a bit stream to a receiver.

2. The transmitter of claim 1, wherein the first format of the video sequence is generated by a video capturing device or an editing device.

3. The transmitter of claim 1, wherein the preprocessing module generates the metadata of the second format of the video sequence according to the first format of the video sequence, the second format of the video sequence and a 3D lookup table.

4. A receiver for handling multiple formats of a video sequence, comprising:
- a decoder, for receiving a bit stream comprising a first format of a video sequence and metadata of a second format of the video sequence from a transmitter, wherein the metadata provides additional information by describing a relation between the first format of the video sequence and the second format of the video sequence, and the first format of the video sequence is a first format of high dynamic range (HDR), and the second format of the video sequence is a second format of HDR; and
- a postprocessing module, couple to the decoder, for generating the second format of the video sequence according to the metadata and the first format of the video sequence.

5. The receiver of claim 4, wherein the first format of the video sequence is generated by a video capturing device or an editing device.

6. The receiver of claim 4, wherein the postprocessing module generates the second format of the video sequence according to the metadata, the first format of the video sequence and a 3D lookup table.

7. A transmitter for handling multiple formats of a video sequence, comprising:
- a preprocessing module, for receiving a first format of a video sequence, to generate metadata of a second format of the video sequence according to the first format of the video sequence and the second format of the video sequence, wherein the metadata provides additional information by describing a relation between the first format of the video sequence and the second format of the video sequence, and the first format of the video sequence is high dynamic range (HDR), and the second format of the video sequence is standard dynamic range (SDR); and
- an encoder, couple to the preprocessing module, for transmitting the first format of the video sequence and the metadata in a bit stream to a receiver.

8. The transmitter of claim 7, wherein the first format of the video sequence is generated by a video capturing device or an editing device.

9. The transmitter of claim 7, wherein the preprocessing module generates the metadata of the second format of the video sequence according to the first format of the video sequence, the second format of the video sequence and a 3D lookup table.

* * * * *